United States Patent [19]

Nakamura

[11] Patent Number: 4,502,667

[45] Date of Patent: Mar. 5, 1985

[54] ELECTRIC HOIST

[75] Inventor: Takayoshi Nakamura, Atsugi, Japan

[73] Assignee: Kabushiki Kaisha Kito, Yamanashi, Japan

[21] Appl. No.: 524,713

[22] Filed: Aug. 19, 1983

[30] Foreign Application Priority Data

Aug. 25, 1982 [JP] Japan ............................... 57-146210

[51] Int. Cl.³ ......................... B66D 1/14; F16D 47/00

[52] U.S. Cl. .................................... 254/350; 254/355; 254/903; 192/48.3; 464/46

[58] Field of Search ............... 254/350, 903, 370, 355; 192/56 R, 48.3, 48.92, 48.6; 464/46, 38

[56] References Cited

U.S. PATENT DOCUMENTS

| | | | |
|---|---|---|---|
| 2,501,096 | 3/1950 | Robins et al. | 254/903 X |
| 3,072,234 | 1/1963 | Maurice et al. | 192/48.3 |
| 3,741,527 | 6/1973 | Dahl | 254/350 |
| 3,953,000 | 4/1976 | Zorbaugh | 192/56 R X |
| 4,023,744 | 5/1977 | Shutt | 254/903 X |
| 4,348,011 | 9/1982 | Honda | 254/350 |

FOREIGN PATENT DOCUMENTS 42937 11/1978 Japan .

*Primary Examiner*—John M. Jillions
*Assistant Examiner*—Joseph J. Hail, III
*Attorney, Agent, or Firm*—Sughrue, Mion, Zinn, Macpeak and Seas

[57] ABSTRACT

An electric hoist includes an electric motor, a driving shaft connected to a rotor shaft of said electric motor, a reduction gear train for transmitting rotation of the driving shaft to a load sheave, and a mechanical brake assembly in the reduction gear train. According to the invention between the driving shaft and the rotor shaft of the motor is arranged an overload safety device comprising a support member fixed to the rotor shaft, a retainer member fitted onto the driving shaft, and a disc arranged between the support and retainer members through friction plates and having a one-way clutch. The one friction plate between the retainer plate and the disc has larger friction transmission force than that of the other friction plate between the support member and the disc. With this arrangement, the electric hoist according to the invention is able to automatically prevent lifting, lowering and dragging a load under overload condition, and enables the once raised load to be securely lowered irrespective of its light or heavy weight.

4 Claims, 4 Drawing Figures

ELECTRIC HOIST

BACKGROUND OF THE INVENTION

1. Field of the Invention

This invention relates to an electric hoist having overload safety means for preventing lifting, lowering and dragging under overload condition and capable of securely lowering a load irrespective of its light or heavy weight.

2. Description of the Prior Art

With electric hoists such as electric chain blocks whose load sheave is driven through reduction gears by electric motors, it has been proposed to provide on a driven shaft of a reduction gear mechanism a brake assembly consisting of a brake support member, a brake retainer member, a brake ratchet wheel and friction plates between the members and further provide an overload safety device including frictional connections interposed between the brake retainer member and a driven gear fitted thereon, in order to obstruct raising of a load by slippage in the overload safety device when the load sheave is subjected to an overload.

With such an electric hoist, however, the friction transmission force of the overload safety device often becomes less than that of the brake assembly owing to its overtightening, so that once raised a load cannot be lowered due to slippage in the overload safety device.

In order to solve this problem, it has been proposed to interpose a one-way clutch between the driven gear and the brake retainer member to render inoperative the overload safety device when lowering the load, as disclosed for example in Japanese Patent Application Publication No. 42,937/78. In this case, however, as the overload cannot be prevented in lowering the load, it is indispensably required to provide a limit switch for detecting a lowermost position of the load in view of the safety in operation which would possibly make the hoist complicated.

SUMMARY OF THE INVENTION

It is therefore a primary object of the invention to provide an improved electric hoist which solves these problems of the prior art.

It is a general object of the invention to provide an electric hoist whose rotor shaft and a driving shaft are connected by a friction type overload safety device including a one-way clutch and interposing friction plates having different friction transmission capacities, thereby automatically preventing the lifting, lowering and dragging of a load under overload condition and enabling the once raised load to be securely lowered irrespective of its light and heavy weight.

In order to achieve the above objects, the electric hoist including an electric motor, a driving shaft connected to a rotor shaft of said electric motor, a reduction gear train for transmitting rotation of said driving shaft to a load sheave, and a mechanical brake assembly in said reduction gear train according to the invention comprises an overload safety device arranged between said driving shaft and said rotor shaft of said motor, said overload safety device comprising a support member fixed to said rotor shaft, a retainer member fitted onto said driving shaft, and a disc having a one-way clutch and arranged between said support and retainer members through friction plates, said one friction plate between said retainer plate and said disc having larger friction transmission force than that of the other friction plate between said support member and said disc.

In one preferred embodiment of the invention, the one friction plate between the retainer plate and the disc has a larger diameter than that of the other friction plate between the support member and the disc, or the one friction plate between the retainer plate and the disc is made of a material having a larger coefficient of friction than that of a material of the other friction plate between the support member and the disc.

In order that the invention may be more clearly understood, preferred embodiments will be described, by way of example, with reference to the accompanying drawings.

DETAILED DESCRIPTION OF THE PREFERRED EMBODIMENT

Figure 1:
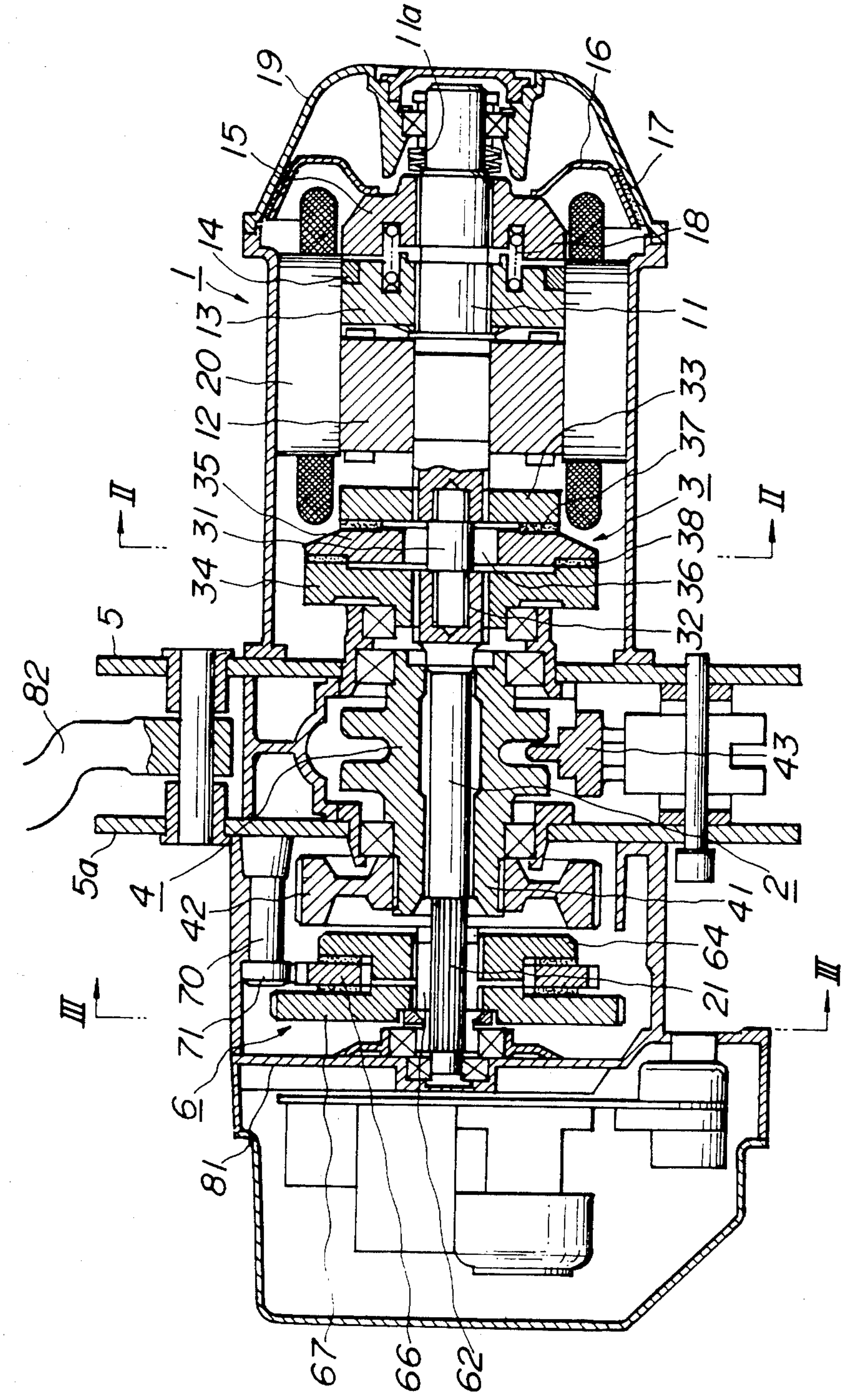
FIG. 1 is a longitudinal sectional view of one embodiment of an electric hoist according to the invention.

Referring to FIG. 1 illustrating one embodiment of the invention, an electric hoist comprises an electric motor 1 including a rotor 12 fixed to a rotor shaft 11, a magnetic pole member 13 and an attracted member 15 made of a magnetic material with a disc 16 provided on its outer periphery with a friction plate 17. The magnetic pole member 13 and the attracted member 15 are axially slidably fitted on the rotor shaft 11 with spline connections or the like. Between the magnetic pole member 13 and the attracted member 15 is interposed a spring 18 normally resiliently urging the attracted member 15 to the right as viewed in FIG. 1 to force the friction plate 17 against a front frame 19. The magnetic pole member 13 is made of a non-magnetic material and is provided on its one surface in opposition to the attracted member 15 with a number of attractor elements 14 made of a magnetic material radially embedded in the magnetic pole member 13. A reference numeral 20 denotes a stator of the motor.

Figure 2:
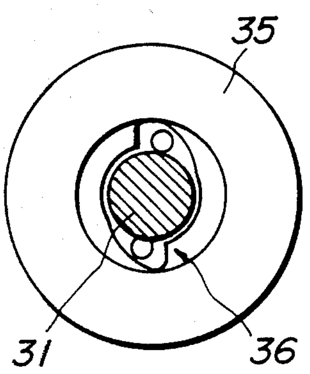
FIG. 2 is a cross-sectional view taken along a line II—II in FIG. 1.

The electric hoist further comprises a driving shaft 2 having at its one end a pinion 21 and at the other end an overload safety device 3. The overload safety device 3 comprises a connecting shaft 31 having one end fitted in the rotor shaft 11 through a key, spline grooves or the like and the other end connected through a bearing 32 to the driving shaft 2. The overload safety device 3 further comprises a friction plate support member 33 fixed to the rotor shaft 11 by means of a spline connection or the like, a friction plate retainer member 34 fitted on the other end of the driving shaft 2 through spline grooves or the like, and a disc 35 fitted on the connecting shaft 31 between the members 33 and 34. Between the disc 35 and the connecting shaft 31 there is provided for example a one-way clutch 36 as shown in FIG. 2. While the one-way clutch 36 is being operated, when the connecting shaft 31 is rotated in a winding-off direction or an clockwise direction as viewed in FIG. 2, the one-way clutch 36 is actuated to transmit the rotation to the disc 35, but does not transmit the rotation of the disc 35 when the connecting shaft 31 is rotated in a winding-up direction or a counterclockwise direction as viewed in FIG. 2.

Friction plates 37 and 38 are respectively interposed between the disc 35 and the members 33 and 34. The friction plate support member 33 is urged through the rotor shaft 11 by resilient members 11a such as dish-like springs to the left as viewed in FIG. 1 to force the friction plates 37 and 38 against the disc 35 and the friction plate retainer member 34. The friction plate 38 interposed between the member 34 and the disc 35 has an effective diameter larger than that of the friction plate 37 interposed between the friction plate support member 33 and the disc 35, thereby enabling the friction plate 38 to transmit a higher torque than that transmitted by the friction plate 37.

A load sheave 4 having at its one end a shaft 41 is loosely fitted on the driving shaft 4 and journaled in bearings in frames 5 and 5a. A driving gear 42 is fixedly fitted on the shaft 41 of the load sheave 4. A chain guide 43 is arranged in opposition to the load sheave 4.

Figure 3:
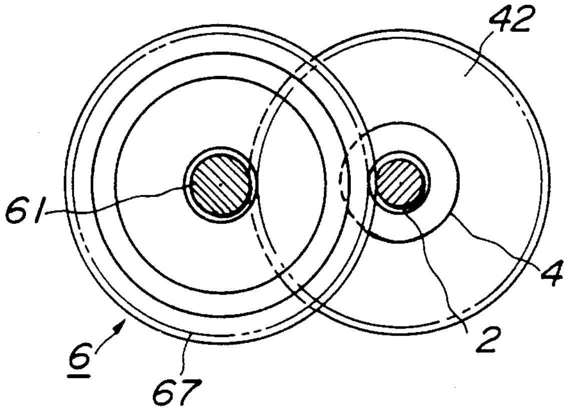
FIG. 3 is a cross-sectional view taken along a line III—III in FIG. 1.
Figure 4:
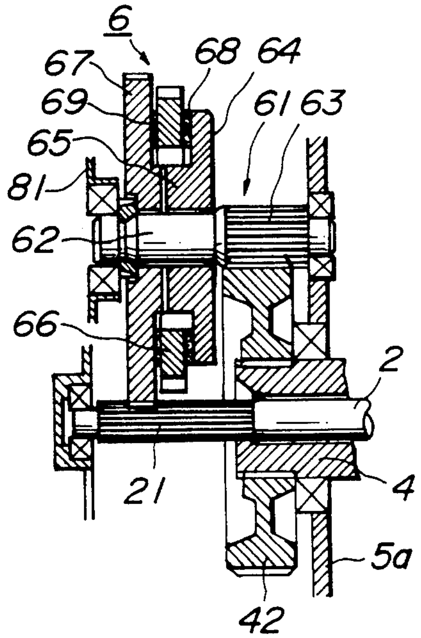
FIG. 4 is a sectional view illustrating a mechanical brake assembly used in the hoist shown in FIG. 1.

A screw type mechanical brake assembly 6 comprises as shown in FIGS. 3 and 4 a driven shaft 61 arranged in parallel with the driving shaft 2 and formed with a screwthreaded portion 62 and a pinion 63, a brake support member 64 having a boss 65 fixedly engaged with the threaded portion 62 of the driven shaft 61, a brake ratchet wheel 66 loosely or rotatably fitted on the boss 65 of the brake support member 64, a driven gear 67 engaged with the threaded portion 62 of the driven shaft 61 and adapted to be in mesh with the pinion 21 of the driving shaft 2, and friction plates 68 and 69 respectively interposed between the ratchet wheel 66 and the driven gear 67 and brake support member 64. As can be seen from FIG. 4, the pinion 63 of the driven shaft 61 is in mesh with the driving gear 42.

A brake pawl 71 is pivotally mounted on a shaft 70 fixed to the frame 5a as shown in FIG. 1 and urged by a spring (not shown) so as to engage the ratchet wheel 66. A reference numeral 81 denotes a rear frame. A hook 82 serves to hang the electric hoist from a ceiling or cross girder. The rotor shaft 11 and driving shaft 2 are journaled in bearings in the front frame 19, frames 5 and 5a and rear frame 81. The driven shaft 61 is also journaled in bearings in the frames 5a and the rear frame 81.

The operation of the electric hoist constructed as above mentioned according to the invention will be explained hereinafter. When the motor 1 is energized for lifting or winding up a load, the attractor elements 14 in the magnetic pole member 13 are magnetized to attract the attracted member 15 to the magnetic pole member 13 against the force of the spring 18 so that the disc 16 is moved to the left as viewed in FIG. 1 to release the braking action of the friction plate 17 so as to permit the rotor shaft 11 to be rotated. The rotation of the rotor shaft 11 is transmitted through the support member 33, friction plate 37, disc 35, friction plate 38 and retainer member 34 to the driving shaft 2.

The rotation of the driving shaft 2 is transmitted through its pinion 21 to the driven gear 67 (FIG. 4). As the driven gear 67 rotates, it moves to the right as viewed in FIGS. 1 and 4 on the threaded portion 62 of the driven shaft 61 owing to the threaded engagement therebetween to join the driven gear 67, ratchet wheel 66 and brake support member 64 together with the friction plates 68 and 69 interposed therebetween into a frictionally combined unit. Accordingly, the driven shaft 61 is rotated to cause the load sheave 4 to be rotated through the driving gear 42 engaged with the pinion 63, so that the load is raised or lifted by a chain (not shown) wound about the load sheave 4. It is of course understood in this case that the rotating speed of the driving shaft 2 is considerably reduced through the reduction gear train including the pinion 21, driven gear 67, pinion 63 and driving gear 42 to be transmitted to the load sheave 4.

If a weight of the load is more than a rated value, the friction plate 37 of the overload safety device 3 is slipped relative to the support member 33 or disc 35 and the one-way clutch 36 is brought into an inoperative condition, so that the rotor shaft 11 is idly rotated without transmitting the torque of the rotor shaft to the driving shaft 2. As the load cannot be raised or lifted under such a condition of the hoist, the hoisting or dragging of the overload is automatically prevented.

When the motor 1 is deenergized, the attracted body 15 is returned to its original position by means of the spring 18 to urge the friction plate 17 against the front frame 19 so as to cause the braking action which holds the hoisted load in its position.

When it is required to lower the load, the motor 1 is energized to rotate the rotor shaft 11 in a reverse direction. The rotation of the rotor shaft 11 is transmitted through the overload safety device 3 to the driving shaft 2. The rotation of the driving shaft 2 is then transmitted to the pinion 21 and driven gear 67 so that the load is lowered with the aid of the mutual action of the weight of the load and the mechanical brake assembly 6.

If an overload occurs during lowering the load, the friction plate 37 of the overload safety device 3 is subjected to a force slipping it relative to the support member 33 or the disc 35. However, the relative rotation between the rotor shaft 11 and respectively the support member 33 and disc 35 is prevented by the one-way clutch 36 in the disc 35, so that the friction plate 38 slips relatively to the disc 35 or retainer member 34 without transmitting the torque on the rotor shaft 11 to the driving shaft 2. Accordingly, even if a stopper (not shown) provided on one end of the chain wound about the load sheave 4 remote from the other end suspending the load strikes the chain guide 43 at the lowermost position of the load, the lowering of the load is stopped without any damage of the chain guide 43, thereby automatically preventing the lowering of the overload. The electric hoist according to the invention can therefore dispense with a limit switch for detecting the lowermost position for winding-off a load.

Moreover, even if the mechanical brake assembly 6 is clamped to an excess extent when a lifting load is stopped, the load can be securely lowered without stoppage of the load during lowering because the winding-off torque of the overload safety device 3 has been set to be larger than the friction transmission force of the mechanical brake assembly 6.

In the above explanation, one example of the one-way clutch for use in the overload safety device has been shown in FIG. 2. However, any other one-way clutches may be used for this purpose. Moreover, instead of the screw type mechanical brake assembly, a cam type mechanical brake assembly may be used. In the above embodiment, moreover, the effective diameter of the friction plate 38 interposed between the retainer member 34 and disc 35 is made larger than that of the friction plate 37 interposed between the support member 33 and disc 35 of the overload safety device in order to that the winding-off or lowering torque is made larger than the winding-up or lifting torque of the overload safety device. However, the effective diameters of the friction plates 37 and 38 may be made substantially equal to each other for the purpose so long as the friction plate 38 is made of a material having a coefficient of friction larger than that of a material of the friction plate 37.

As can be seen from the above description, the electric hoist according to the invention comprises a one-way clutch between a driving shaft and a rotor shaft of a motor and an overload safety device constructed as its winding-off torque larger than its winding-up torque, thereby automatically preventing the lifting, lowering or dragging of a load under overload condition, and enabling the once raised or lifted load to be securely lowered regardless of its light or heavy weight. Therefore, the electric hoist according to the invention brings about significant effects in actual use.

It is further understood by those skilled in the art that the foregoing description is that of preferred embodiments of the disclosed hoists and that various changes and modifications may be made in the invention without departing from the spirit and scope thereof.

What is claimed is:

1. An electric hoist including an electric motor, a driving shaft connected to a rotor shaft of said electric motor, a reduction gear train for transmitting rotation of said driving shaft to a load sheave, and a mechanical brake assembly in said reduction gear train, comprising an overload safety device arranged between said driving shaft and said rotor shaft of said motor, said overload safety device comprising a support member fixed to said rotor shaft, a retainer member fitted onto said driving shaft, and a disc having a one-way clutch and arranged between said support and retainer members through friction plates, one of said friction plates between said retainer plate and said disc having larger friction transmission force than that of the other friction plate between said support member and said disc.

2. An electric hoist as set forth in claim 1, wherein said one friction plate between said retainer plate and said disc has a larger diameter than that of the other friction plate between said support member and said disc.

3. An electric hoist as set forth in claim 1, wherein said one friction plate between said retainer plate and said disc is made of a material having a larger coefficient of friction than that of a material of the other friction plate between said support member and said disc.

4. An electric hoist as set forth in claim 1, wherein said one-way clutch comprises steel rollers and a disc having recesses for embracing said rollers therein with the aid of a center shaft to connect said clutch when it is rotated in one direction.

* * * * *